US009239695B2

(12) United States Patent
Feehan et al.

(10) Patent No.: US 9,239,695 B2
(45) Date of Patent: Jan. 19, 2016

(54) MULTI-REGION INTERACTIVE DISPLAY (71) Applicant: AMI Entertainment Network, Inc., Bristol, PA (US)

(72) Inventors: Kenneth A. Feehan, Belmont, CA (US); David S. Schmidt, San Francisco, CA (US); Howard L. Spielman, Placerville, CA (US)

(73) Assignee: AMI Entertainment Network, LLC, Trevose, PA (US)

( * ) Notice: Subject to any disclaimer, the term of this patent is extended or adjusted under 35 U.S.C. 154(b) by 0 days.

(21) Appl. No.: 13/895,904

(22) Filed: May 16, 2013

(65) Prior Publication Data

US 2013/0314301 A1     Nov. 28, 2013

Related U.S. Application Data

(63) Continuation of application No. 12/383,823, filed on Mar. 25, 2009, now Pat. No. 8,493,339.

(51) Int. Cl.
*G09G 5/00* (2006.01)
*G06F 3/14* (2006.01)
(Continued)

(52) U.S. Cl.
CPC ............ *G06F 3/1423* (2013.01); *G06F 3/0482* (2013.01); *G06F 3/04886* (2013.01); *H04L 67/32* (2013.01)

(58) Field of Classification Search
CPC . G06F 3/0482; G06F 3/04886; G06F 3/1423; H04L 67/32
USPC ............ 345/473, 2.1–2.3, 156–184; 348/143, 348/152, 156, 158, 221.2; 725/30–37, 78, 725/92, 105, 132; 715/201, 205, 210, 222, 715/234, 705, 716, 748; 705/7.13, 9, 14.73, 705/402
See application file for complete search history.

(56) References Cited

U.S. PATENT DOCUMENTS 4,817,043 A    3/1989   Brown
5,233,423 A    8/1993   Jernigan et al.
(Continued)

FOREIGN PATENT DOCUMENTS

DE    9310553 U1    9/1993
GB    2170943 A     8/1986
(Continued)

OTHER PUBLICATIONS

Normile, Dennis (May 1997) "Flat TV Arrives". Popular Science (Bonnier Corporation) 250 (5). ISSN 0161-7370.
(Continued)

*Primary Examiner* — Prabodh M Dharia
(74) *Attorney, Agent, or Firm* — Panitch Schwarze Belisario & Nadel LLP (57) ABSTRACT

A multi-region interactive display is provided. In some embodiments, a multi-region interactive display includes a display including a plurality of display regions, the display configured to provide content in at least a first display region and a second display region; a processor configured to select content for display in at least one of the display regions; and a memory coupled to the processor and configured to provide the processor with instructions, in which the first display region and second display region are configured so that when a first user interacts with the first display region, a second user's view of the second display region is at least partially visible.

17 Claims, 9 Drawing Sheets

(51) Int. Cl.
*H04L 29/08* (2006.01)
*G06F 3/0482* (2013.01)
*G06F 3/0488* (2013.01)

(56) References Cited

U.S. PATENT DOCUMENTS

| | | | |
|---|---|---|---|
| 5,255,358 | A | 10/1993 | Busboom et al. |
| 5,353,400 | A | 10/1994 | Nigawara et al. |
| 5,384,910 | A | 1/1995 | Torres |
| 5,761,071 | A | 6/1998 | Bernstein et al. |
| 5,771,778 | A | 6/1998 | MacLean, IV |
| 5,835,843 | A | 11/1998 | Haddad |
| 5,884,298 | A | 3/1999 | Smith, II et al. |
| 5,963,916 | A | 10/1999 | Kaplan |
| 6,031,795 | A | 2/2000 | Wehmeyer |
| 6,215,411 | B1 | 4/2001 | Gothard |
| 6,248,946 | B1 | 6/2001 | Dwek |
| 6,314,573 | B1 | 11/2001 | Gordon et al. |
| 6,314,575 | B1 | 11/2001 | Billock et al. |
| 6,346,951 | B1 | 2/2002 | Mastronardi |
| 6,356,283 | B1 | 3/2002 | Guedalia |
| 6,384,736 | B1 | 5/2002 | Gothard |
| 6,397,189 | B1 | 5/2002 | Martin et al. |
| 6,446,130 | B1 | 9/2002 | Grapes |
| 6,587,403 | B1 | 7/2003 | Keller et al. |
| 6,670,934 | B1 | 12/2003 | Muoio et al. |
| 6,942,574 | B1 | 9/2005 | LeMay et al. |
| 6,970,834 | B2 | 11/2005 | Martin et al. |
| 7,114,131 | B1 | 9/2006 | Ballantine |
| 7,185,288 | B2 | 2/2007 | McKeever |
| 7,188,352 | B2 | 3/2007 | Nathan et al. |
| 7,369,058 | B2 | 5/2008 | Gothard |
| 7,600,266 | B2 | 10/2009 | Thomas |
| 7,657,910 | B1 | 2/2010 | McAulay et al. |
| 7,844,481 | B2 | 11/2010 | Hilbush et al. |
| 7,937,724 | B2 | 5/2011 | Clark et al. |
| 8,099,482 | B2 | 1/2012 | Clark et al. |
| 8,151,210 | B2 | 4/2012 | Nezu et al. |
| 8,493,339 | B1 | 7/2013 | Feehan et al. |
| 2001/0001160 | A1 | 5/2001 | Shoff et al. |
| 2002/0002079 | A1 | 1/2002 | Martin et al. |
| 2002/0023010 | A1 | 2/2002 | Rittmaster et al. |
| 2002/0113812 | A1* | 8/2002 | Walker et al. ............. 345/719 |
| 2002/0188363 | A1 | 12/2002 | Ashy |
| 2003/0003876 | A1* | 1/2003 | Rumsey ............... G06F 1/1626 455/74 |
| 2003/0083940 | A1 | 5/2003 | Kumar et al. |
| 2003/0084452 | A1 | 5/2003 | Ryan et al. |
| 2004/0010800 | A1 | 1/2004 | Goci |
| 2004/0025185 | A1* | 2/2004 | Goci et al. ............... 725/92 |
| 2004/0059625 | A1 | 3/2004 | Schrader |
| 2004/0066397 | A1* | 4/2004 | Walker et al. ............ 345/719 |
| 2004/0122773 | A1 | 6/2004 | McCombs et al. |
| 2004/0210824 | A1 | 10/2004 | Shoff et al. |
| 2004/0243482 | A1* | 12/2004 | Laut ............................ 705/27 |
| 2005/0015815 | A1 | 1/2005 | Shoff et al. |
| 2005/0024325 | A1 | 2/2005 | Fleischmann et al. |
| 2005/0033758 | A1* | 2/2005 | Baxter ............. G06F 17/30038 |
| 2005/0038758 | A1 | 2/2005 | Hilbush et al. |
| 2005/0044254 | A1* | 2/2005 | Smith ............... G07F 17/305 709/231 |
| 2005/0099403 | A1 | 5/2005 | Kraus et al. |
| 2005/0267676 | A1 | 12/2005 | Nezu et al. |
| 2006/0026162 | A1* | 2/2006 | Salmonsen et al. ............. 707/10 |
| 2006/0028398 | A1 | 2/2006 | Willmore |
| 2006/0059530 | A1 | 3/2006 | Spielman et al. |
| 2006/0074750 | A1 | 4/2006 | Clark et al. |
| 2006/0092037 | A1* | 5/2006 | Neogi ..................... G08C 23/04 340/4.3 |
| 2006/0122896 | A1 | 6/2006 | Parsley |
| 2006/0137015 | A1* | 6/2006 | Fahrny et al. ................. 726/26 |
| 2006/0287913 | A1 | 12/2006 | Baluja |
| 2007/0005334 | A1* | 1/2007 | Salmonsen ................ 703/26 |
| 2007/0101361 | A1 | 5/2007 | Spielman et al. |
| 2007/0101362 | A1 | 5/2007 | Spielman et al. |
| 2007/0101365 | A1 | 5/2007 | Clark et al. |
| 2007/0199014 | A1 | 8/2007 | Clark et al. |
| 2007/0220580 | A1 | 9/2007 | Putterman et al. ............ 725/134 |
| 2007/0242052 | A1 | 10/2007 | Lin et al. |
| 2007/0250862 | A1* | 10/2007 | Miyamaki et al. .............. 725/46 |
| 2007/0250863 | A1* | 10/2007 | Ferguson ....................... 725/46 |
| 2008/0033739 | A1 | 2/2008 | Zuckerberg et al. |
| 2008/0126936 | A1* | 5/2008 | Williams ....................... 715/717 |
| 2008/0222707 | A1 | 9/2008 | Pathuri et al. |
| 2008/0229371 | A1* | 9/2008 | Mick et al. ..................... 725/87 |
| 2008/0229374 | A1* | 9/2008 | Mick et al. ..................... 725/93 |
| 2008/0239887 | A1* | 10/2008 | Tooker et al. ............. 369/30.06 |
| 2008/0271066 | A1 | 10/2008 | Spielman |
| 2008/0302867 | A1* | 12/2008 | Holberg ....................... 235/375 |
| 2008/0303782 | A1 | 12/2008 | Grant et al. |
| 2009/0015599 | A1* | 1/2009 | Bennett ................ G06F 3/0486 345/680 |
| 2009/0083326 | A1* | 3/2009 | Pelton ............... G06F 17/30053 |
| 2009/0222864 | A1* | 9/2009 | Drakoulis ............. G11B 27/34 725/87 |
| 2009/0240355 | A1* | 9/2009 | Buil et al. ...................... 700/94 |
| 2010/0017714 | A1* | 1/2010 | Agarwal ................ G06Q 10/00 715/716 |
| 2010/0053094 | A1 | 3/2010 | Kong et al. |
| 2010/0064007 | A1 | 3/2010 | Randall ......................... 709/204 |
| 2010/0136943 | A1* | 6/2010 | Hirvela et al. .............. 455/404.1 |
| 2010/0274673 | A1 | 10/2010 | Isaac |
| 2010/0332284 | A1 | 12/2010 | Hilbush et al. |
| 2011/0004822 | A1 | 1/2011 | Nezu et al. |
| 2011/0225494 | A1 | 9/2011 | Shmuylovich et al. |
| 2011/0276993 | A1* | 11/2011 | Ferguson ....................... 725/30 |
| 2011/0320946 | A1* | 12/2011 | Nathan et al. ................. 715/716 |
| 2012/0084130 | A1* | 4/2012 | Holberg ....................... 705/14.25 |
| 2012/0150614 | A1* | 6/2012 | Dion et al. .................. 705/14.32 |
| 2012/0158531 | A1* | 6/2012 | Dion et al. ................... 705/26.1 |
| 2013/0067512 | A1* | 3/2013 | Dion et al. ...................... 725/34 |
| 2013/0254676 | A1* | 9/2013 | Feehan et al. ................. 715/748 |

FOREIGN PATENT DOCUMENTS

| | | | |
|---|---|---|---|
| WO | 0108148 | A1 | 2/2001 |
| WO | 2005069200 | A2 | 7/2005 |

OTHER PUBLICATIONS iPhone OS 2.0 review (Jul. 14, 2008).
Office Action issued May 27, 2015 in U.S. Appl. No. 13/895,851 by Feehan.
Office Action issued Sep. 17, 2015 in U.S. Appl. No. 13/895,851 by Feehan.

* cited by examiner

MULTI-REGION INTERACTIVE DISPLAY

CROSS-REFERENCE TO RELATED APPLICATIONS

This application is a Continuation of U.S. patent application Ser. No. 12/383,823 filed Mar. 25, 2009, the disclosure of which is incorporated by reference herein in its entirety.

BACKGROUND OF THE INVENTION

Kiosks and jukeboxes exist today. These kiosks and jukeboxes typically include a small display screen (e.g., 15 inches to 19 inches) with just a single, dedicated display region.

BRIEF DESCRIPTION OF THE DRAWINGS

Various embodiments of the invention are disclosed in the following detailed description and the accompanying drawings.

DETAILED DESCRIPTION

Various embodiments of the invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
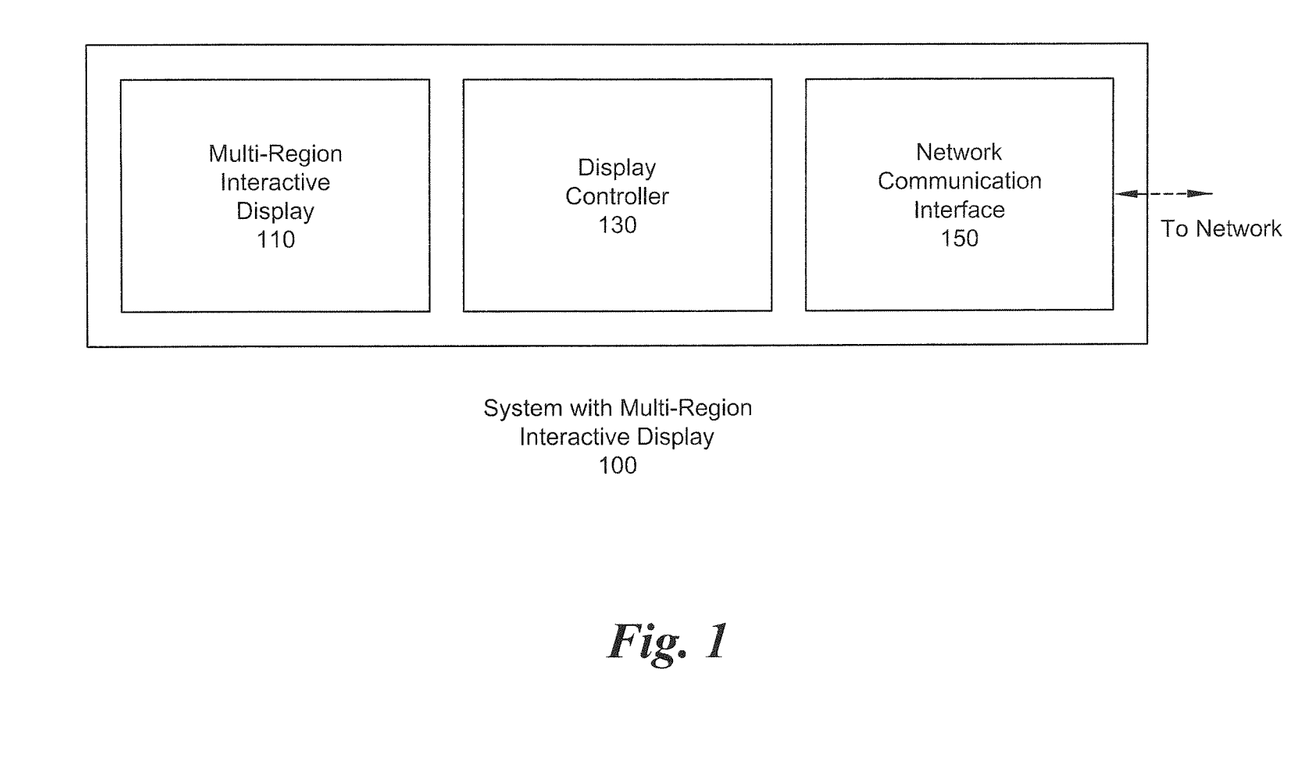
FIG. 1 is a functional diagram illustrating a system with multi-region interactive display in accordance with some embodiments.

FIG. 1 is a functional diagram illustrating a system with multi-region interactive display in accordance with some embodiments. As shown, a system with multi-region interactive display 100 includes a multi-region interactive display 110, a display controller 130, and a network communication interface 150. In some embodiments the system with multi-region interactive display 100 is in wired line or wireless communication (e.g., Wi-Fi, DSL, DOCSIS, EVDO, satellite, or other network communication) with a network that is in communication with the Internet.

In some embodiments, the multi-region interactive display 110 includes at least two display regions for providing a first content (e.g., interactive content) displayed in a first display region and a second content displayed in a second display region. In some embodiments, the multi-region interactive display 110 is a partitioned display (e.g., a software/graphical partition) that includes at least two display regions, in which the content displayed on each of the two display regions are interdependent (e.g., content displayed in a second display region depends and/or is related at least in part to content displayed on a first display region of the multi-region interactive display 110). In some embodiments, the system with multi-region interactive display 100 receives software updates and/or pew software downloads (e.g., secure software downloads/updates for operating system software, applications, advertisements, content, and/or other software) via the Internet. In some embodiments, the system with multi-region interactive display 100 is a multimedia kiosk. In some embodiments, the system with multi-region interactive display 100 is a multimedia jukebox in which a jukebox application is displayed in a first display region (e.g., lower display region of a partitioned display) and a persistent video/advertising application is displayed in a second display region (e.g., higher display region of the partitioned display). In some embodiments, the system with multi-region interactive display 100 is an interactive kiosk (e.g., for a retail/shopping store, retail/shopping center, professional center, educational center, sports arena, museum, and/or hotel), in which the kiosk includes at least two modes of operation that can be configured based on a toggle setting or programmed for use based on a programming schedule.

Figure 2:
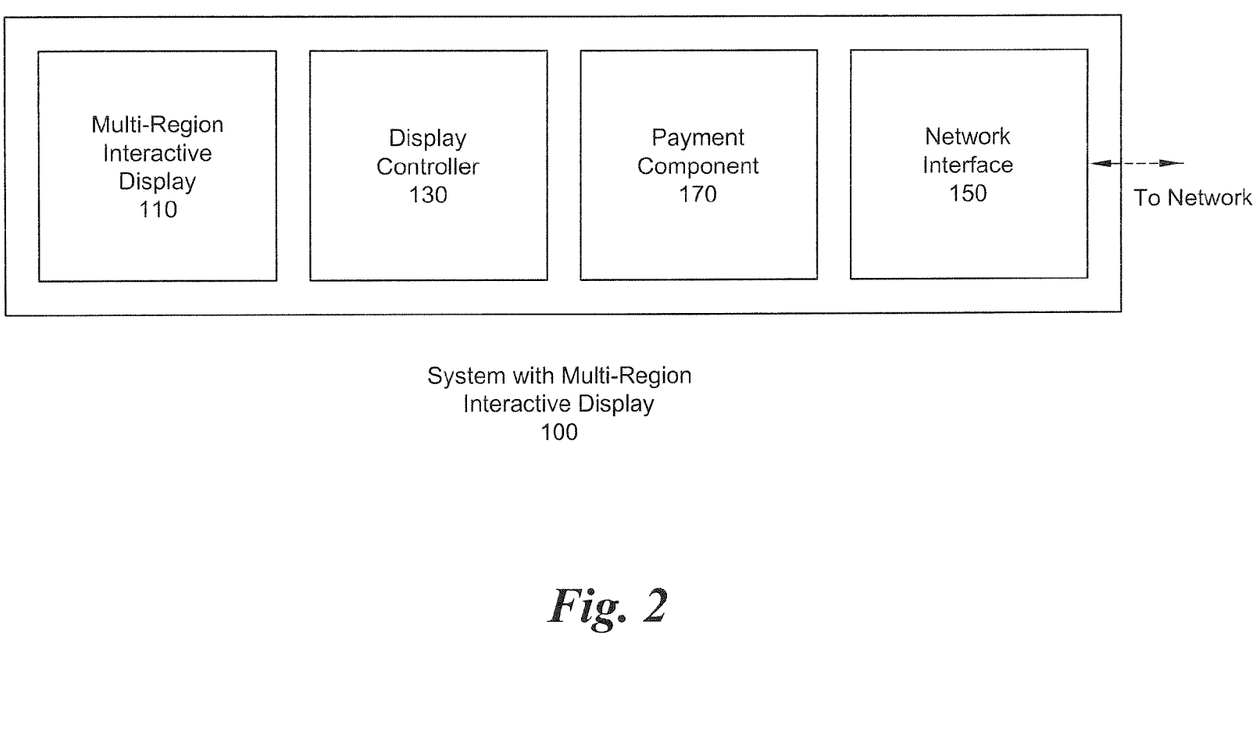
FIG. 2 is another functional diagram illustrating a system with multi-region interactive display in accordance with some embodiments.

FIG. 2 is another functional diagram illustrating a system with multi-region interactive display in accordance with some embodiments. As shown, a system with multi-region interactive display 100 includes a multi-region interactive display 110, a display controller 130, a network interface 150, and a payment component 170. In some embodiments, the payment component 170 receives cash and/or credit/ATM cards from users for payment (e.g., a Mars 1600 combo bill and credit card acceptor). In some embodiments, the system with multi-region interactive display 100 requests that the user provide payment for one or more applications and/or services requested by the user interacting with the multi-region interactive display 110. In some embodiments, the system with multi-region interactive display 100 provides one or more of the following applications/services: custom applications (e.g., for a particular venue, such as customized training application, venue map, and/or services application), mobile applications, video, localized content, social applications, and various other applications, such as a text message application, a photo application, an advertising application, a music application, a video application, a music video application, a game application, a food ordering application, a drink ordering application, a concierge service (e.g., a virtual hotel concierge), a ticket service, and a taxi service.

In some embodiments the system with multi-region interactive display 100 provides a multimedia music jukebox that provides a selection of songs (and/or songs with music videos or other associated video content) (e.g., for free or for a payment by the user). In some embodiments, the system with the multi-region interactive display 100 executes applications that allow users of the system to interact with applications (e.g., mini-sites, also referred to herein as mini-web sites, that allow users to access content or upload/download content using the World Wide Web (WWW) via the Internet, such as a FLICKR photo application, GOOGLE maps application, YOUTUBE video application, or any other WWW/Internet based application). For example, a user can upload photos taken at the location of the system (or other photos that the user wants to share with other customers/patrons) with the multi-region interactive display 100 to a FLICKER account that is associated with that system. In some embodiments, the text message application (and/or photo/video/other applications) perform auto filtering to restrict content that can be displayed/shared with other users (e.g., customers) based on a privacy and/or content policy, which can be automatically configured based on the venue of the system with the multi-region interactive display 100 (e.g., a first content policy can be provided for a bar venue and a second content policy can be provided for a family restaurant venue) and/or configured specifically for that system/venue (e.g., during installation/setup or at a later point in time by a user with system administration privileges).

In some embodiments, the system with the multi-region interactive display 100 provides dynamic and fully customizable content, which, for example, can be dynamically downloaded via the network (e.g., the Internet). For example, ads can be served for display in the second display region of the multi-region interactive display 110 using ad serving technology (e.g., DOUBLECLICK ad serving technology), which provides advertisers with targeting, measurement, survey and reporting capabilities similar to WWW ads. As another example, ads can be served for display in the second display region of the multi-region interactive display 110 based on user interactions with the first display region of the multi-region interactive display 110 (e.g., to provides context relevant ads at relevant periods of time) and/or based on a location and/or venue of the system 100.

In some embodiments, two or more of the regions or all of the regions of the multi-region interactive display 110 are used for non-interactive content when the system with the multi-region interactive display 100 is idle (e.g., providing a full screen attract mode). In some embodiments, two or more of the regions or all of the regions of the multi-region interactive display 110 are used for interactive content (e.g., providing a full screen mini-site mode).

Figure 3:
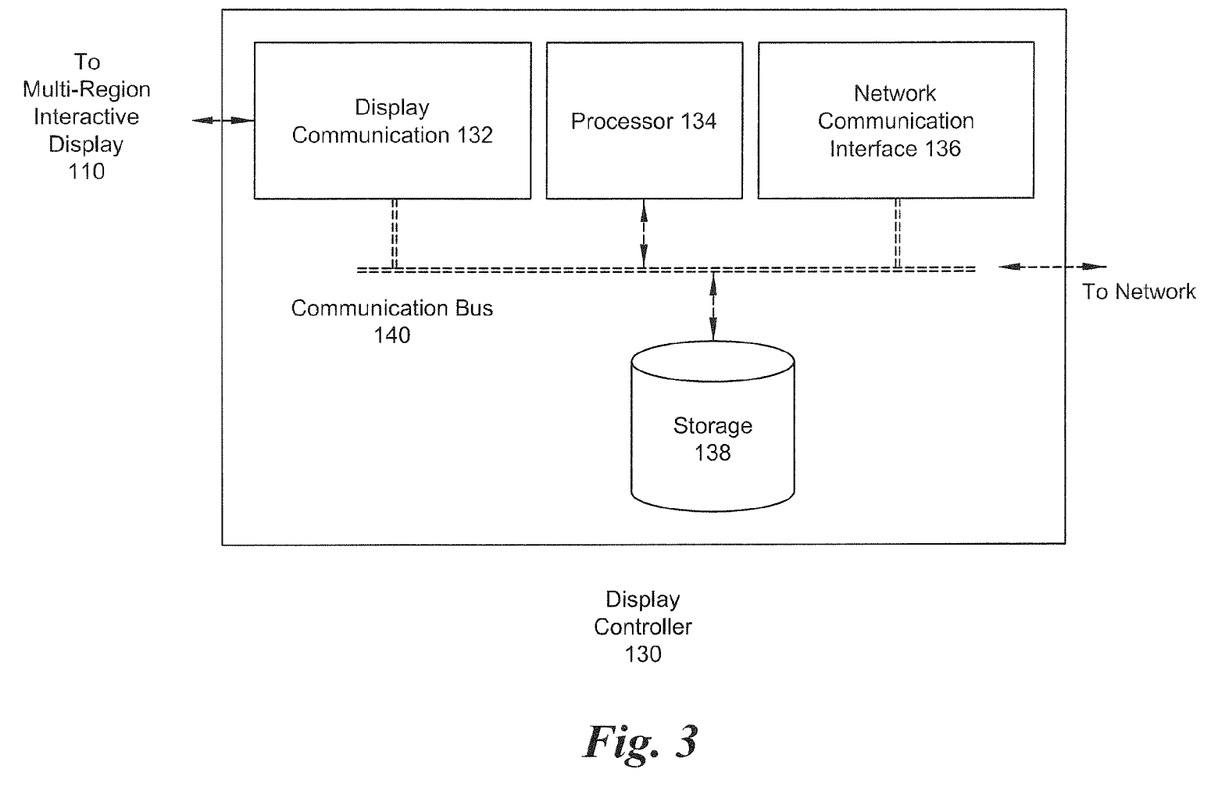
FIG. 3 is a functional diagram illustrating a display controller in accordance with some embodiments.

FIG. 3 is a functional diagram illustrating a display controller in accordance with some embodiments. As shown, a display controller 130 includes a display communication 132 for communicating with the multi-region interactive display 110, a processor 134 for controlling the system with multi-region interactive display 100, a network communication interface 136 for controlling network interface 150, a storage 138 (e.g., 80 GB storage drive) for storing data and/or executable applications and/or advertisements/video/music/other content, and a communication bus 140. In some embodiments, the display controller 130 includes an operating system (OS) (e.g., an embedded OS, such as Windows XP Embedded) executing on a general processor (e.g., an INTEL PENTIUM (dual/multi-core) processor).

Figure 4:
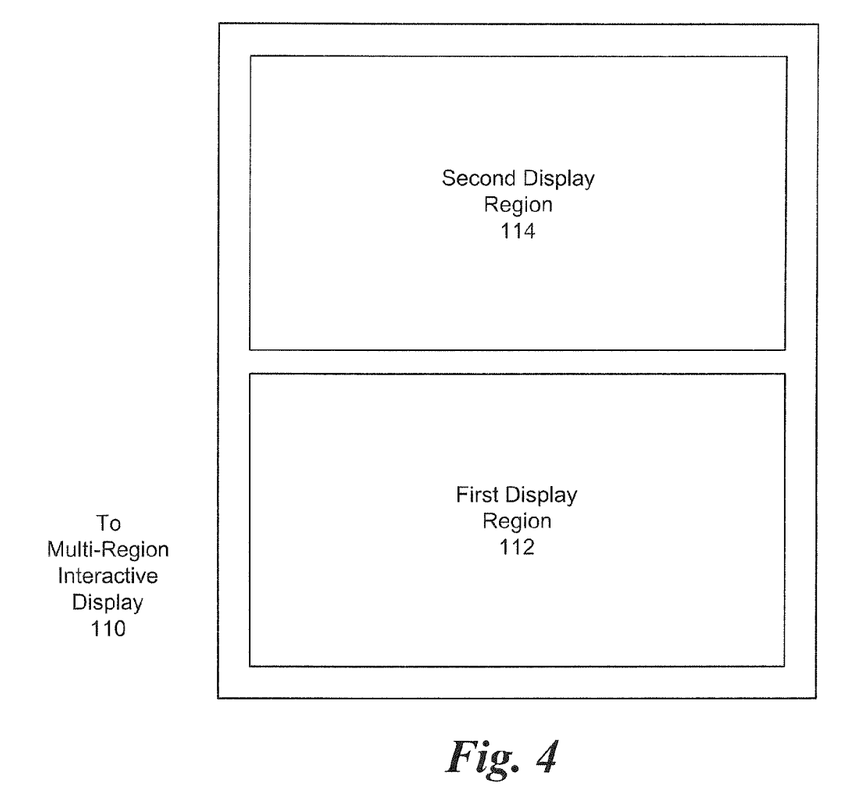
FIG. 4 is a functional diagram illustrating a multi-region interactive display in accordance with some embodiments.

FIG. 4 is a functional, diagram illustrating a multi-region interactive display in accordance with some embodiments. As shown, the multi-region interactive display 110 includes a first display region 112 and a second display region 114. In some embodiments, the multi-region interactive display 110 is a capacitive touch screen. In some embodiments, the second display region displays persistent video and/or advertising (e.g., the selected content being displayed in the second display region continues to be displayed while the user is interacting with the first display region). For example, a multimedia jukebox or multimedia kiosk can include the multi-region interactive display 110 to provide persistent advertising in a second (top) display region, which is visible to other users (e.g., customers (other users) within eye view of the multi-region interactive display 110) while still allowing a customer (a first user) to interact with content in a first (bottom) display region of the multi-region interactive display 110. In some embodiments, user selected content for the first display region 112 determines (at least in part) content for display on the second display region 114 (e.g., persistent video, an advertisement, or another application). In some embodiments, the system with multi-region interactive display 100 displays location based media on at least one of the display regions, in which the location of the system is configured or automatically determined based on a location awareness determination. In some embodiments, the system with multi-region interactive display 100 displays an advertisement on the second display region, in which the advertisement is selected based on one or more of the following: a location of the system, a selected content being displayed on the first display region, and one or more selections received by the first user, in which the location of the system is configured or automatically determined based on a location awareness determination (e.g., based on GPS information, configurations/settings, and or network available location information, such as based upon a zip code of that location being parsed using map information).

Figure 5:
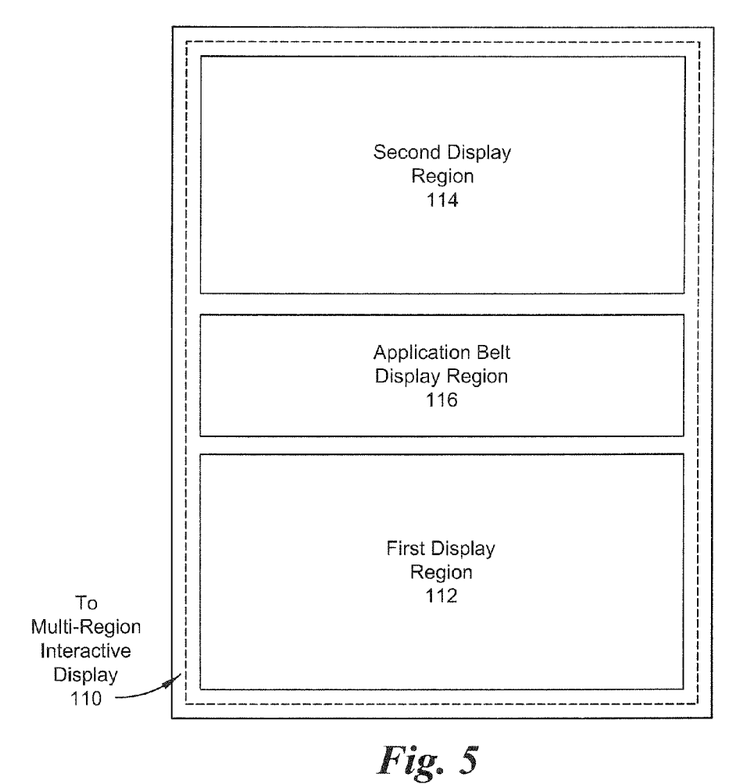
FIG. 5 is another functional diagram illustrating a multi-region interactive display in accordance with some embodiments.

FIG. 5 is another functional diagram illustrating a multi-region interactive display in accordance with some embodiments. As shown, the multi-region interactive display 110 includes a first display region 112, a second display region 114, and an application belt display region 116. In some embodiments, the system with multi-region interactive display 100 displays applications in the application belt display region 116 for selection by the user. In some embodiments, an application that is selected using the interactive application belt 116 is displayed in the first display region 112 and/or the second display region 114 of the multi-region interactive display 110, in which the multi-region interactive display 110 includes two partitioned display regions as well as the application belt display region 116. In some embodiments, an indication (e.g., based on a user input, such as using a touch screen interactive display) for a selection of an application displayed in the application belt region 116 is received, in which the displayed applications for selection include one or more of the following: a text message application, a photo application, an advertising application, a music application, a video application, a game application, a map application, a services application, a training application, and a custom application.

In some embodiments, the system with multi-region interactive display 100 receives a touch based indication to select content for display in at least one of the display regions. In some embodiments, the system with multi-region interactive display 100 receives a touch gesture based indication (e.g., single or multi-touch gesture) to select content for display in at least one of the display regions (e.g., rotating or spinning the application belt display region 116 using a single or multi-touch gesture via one application icon at a time and/or multiple application icons at a time). In some embodiments, the system with multi-region interactive display 100 includes a capacitive touch screen and further includes an interactive application belt region 116 that separates the first display region 112 and the second display region 114, in which the display is configured to provide selectable applications in the belt region 116, and in which applications are selected for display in the belt region using a touch gesture based indication to select among the applications for display in the first display region 112. In some embodiments, the first display region 112, the second display region 114, and/or the interactive application belt display region 116 can be dynamically resized based on user interactions and/or applications or other programming/settings. In some embodiments, the second display region is sized to provide a 4:3 ratio window size.

Figure 6:
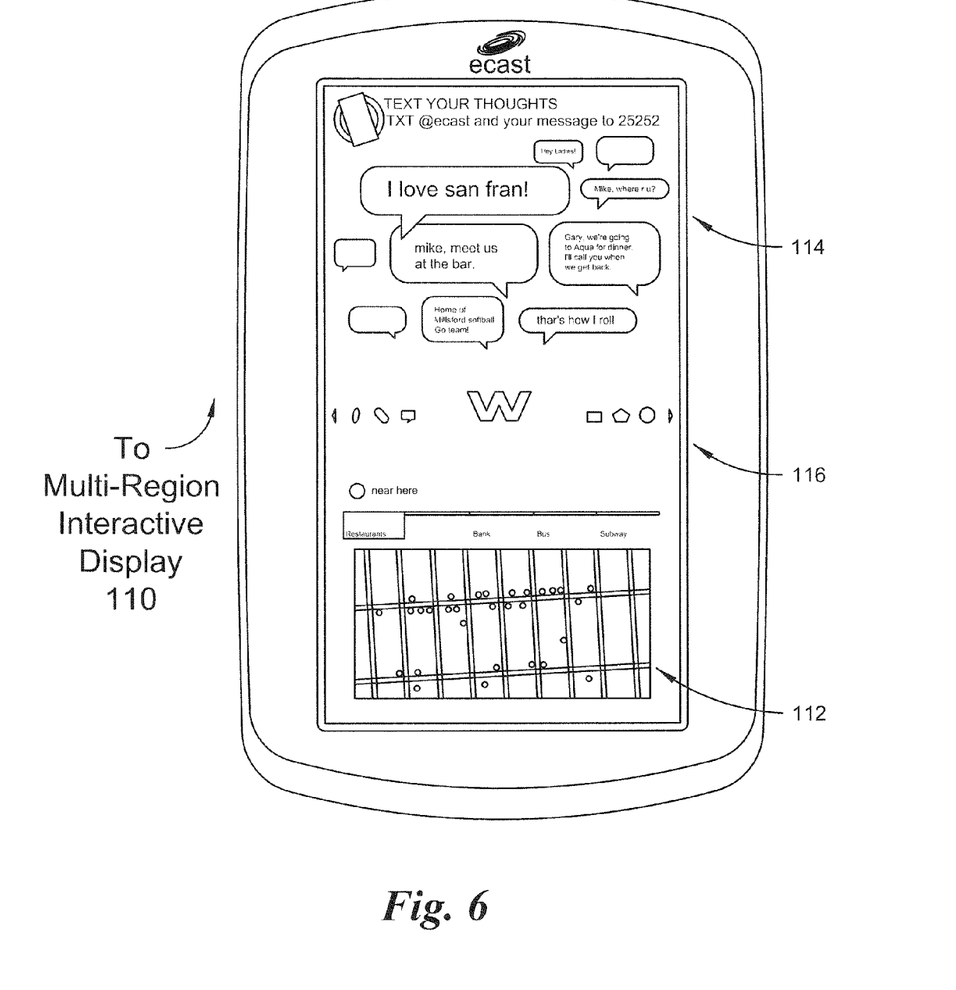
FIG. 6 illustrates a multi-region interactive display in accordance with some embodiments.

FIG. 6 illustrates a multi-region interactive display in accordance with some embodiments. As shown, the multi-region interactive display 110 includes a first display region 112 displaying a map application, a second display region 114 displaying a text message application, and an application belt display region displaying multiple applications for selection by a user. In particular, as shown, the system with the multi-region interactive display 100 includes a text message application, in which the users (e.g., customers of the venue at which the system is located) can send text messages from their mobile phones or other devices that can support text messaging (e.g., SMS) to text other persons in that venue (e.g., restaurant or bar), in which the various received text messages are displayed in a second/higher display region of the multi-region interactive display 110.

In some embodiments, the system with multi-region interactive display 100 displays applications in the interactive application belt region 116 for selection by the user using a gesture based touch screen interface. In some embodiments, the first display region 112 provides a jukebox application, and the second display region provides persistent video (e.g., persistent video/advertisement video or persistent interactive video/advertisement video). In some embodiments, the first display region executes an interactive application, such as an Adobe Flash application that provides interactive content (e.g., a mini-web site for a particular product and/or service that provides interactive multimedia content, such as providing interactive applications, such as a coupon generation application that can be texted or emailed to a user's mobile device, such as a mobile phone, PDA, or laptop/netbook; a map application for locating nearby stores/services; and/or a service ordering application for ordering services delivery). In some embodiments, content for display is dynamically downloaded via the Internet (e.g., based on periodic updates, a user interaction, a location setting, and/or any other criteria, setting, or event).

In some embodiments, the system 100 uses a location awareness determination (e.g., based on GPS information, configurations/settings, and or network available location information, such as based upon a zip code of that location being parsed using map information) to select content for display on the first display region 112, the second display region 114, and/or the interactive application belt display region 116. In some embodiments, content for display on the first display region 112, the second display region 114, and/or the interactive application belt display region 116 is determined based in configuration/settings information and/or a group identification associated with the system 100 (e.g., group IDs can be assigned to systems based on types of locations and/or venues, such as jukebox in a bar or restaurant, jukebox in a family restaurant, kiosk in a hotel/tourist area, kiosk in a retail store/shopping center, kiosk in a sports arena, kiosk in a professional office/center, and/or geography based criteria in part or in addition to venue based criteria). In some embodiments, the system with the multi-region interactive display 100 provides fully customizable content.

Figure 7:
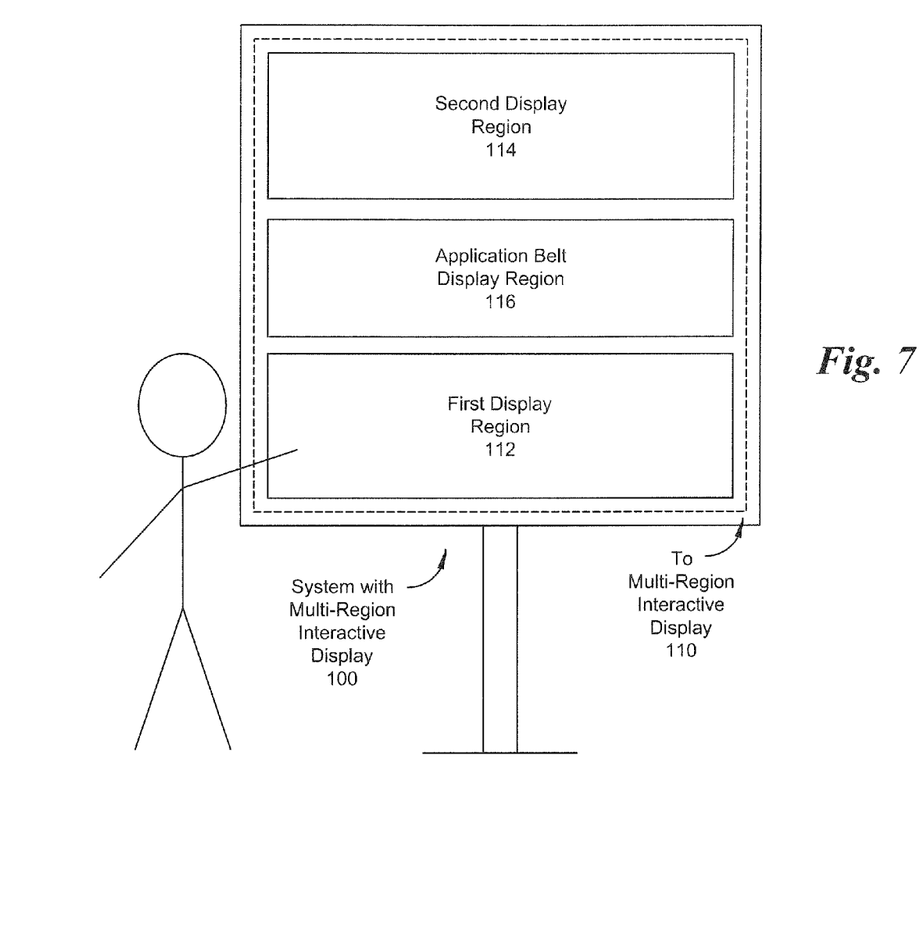
FIG. 7 is another functional diagram illustrating a system with multi-region interactive display and a user interacting with the first display region of the multi-region interactive display in accordance with some embodiments.

FIG. 7 is another functional diagram illustrating a system with multi-region interactive display and a user interacting with the first display region of the multi-region interactive display in accordance with some embodiments. As shown, the system with multi-region interactive display 100 includes the multi-region interactive display 110 includes a first display region 112, a second display region 114, and an interactive application belt display region 116, in which the multi-region interactive display 110 is on a stand such that the first user can interact with the first display region 112 and/or the interactive application belt display region 116 of the multi-region interactive display 110 while standing and such, that the second display region 114 is still visible above the typical first user during such interactions by other users standing at some distance behind the first user (e.g., by other customers in the room, restaurant, bar, store, office or other location of the system 100). For example, the user can interact with the first display region 112 and/or the interactive application belt display region 116 of the multi-region interactive display 110, and other users (e.g., other customers standing in a location behind the first user and within eye view of the multi-region interactive display 110) can continue to view the second display region 114 (at least partially unobstructed).

In some embodiments, the multi-region interactive display 110 is an LCD (liquid crystal display) flat-panel screen (e.g., a large LCD screen, such as a 30 to 60 inch high definition (HD) LCD, such as a 40 inch HD LCD with projected capacitive touch screen that is rotated as a vertical display attached to a floor stand). In some embodiments, the multi-region interactive display 110 is a capacitive touch screen LCD. In some embodiments, the multi-region interactive display 110 is affixed to a wall mount instead of a floor stand, in which the wall mount is located so that a first user (e.g., a typical adult person) can interact with the first display region 112 and/or interactive application belt display region 116 while not obstructing a view of the second display region 114 for other users located at some distance behind the first user.

Figure 8:
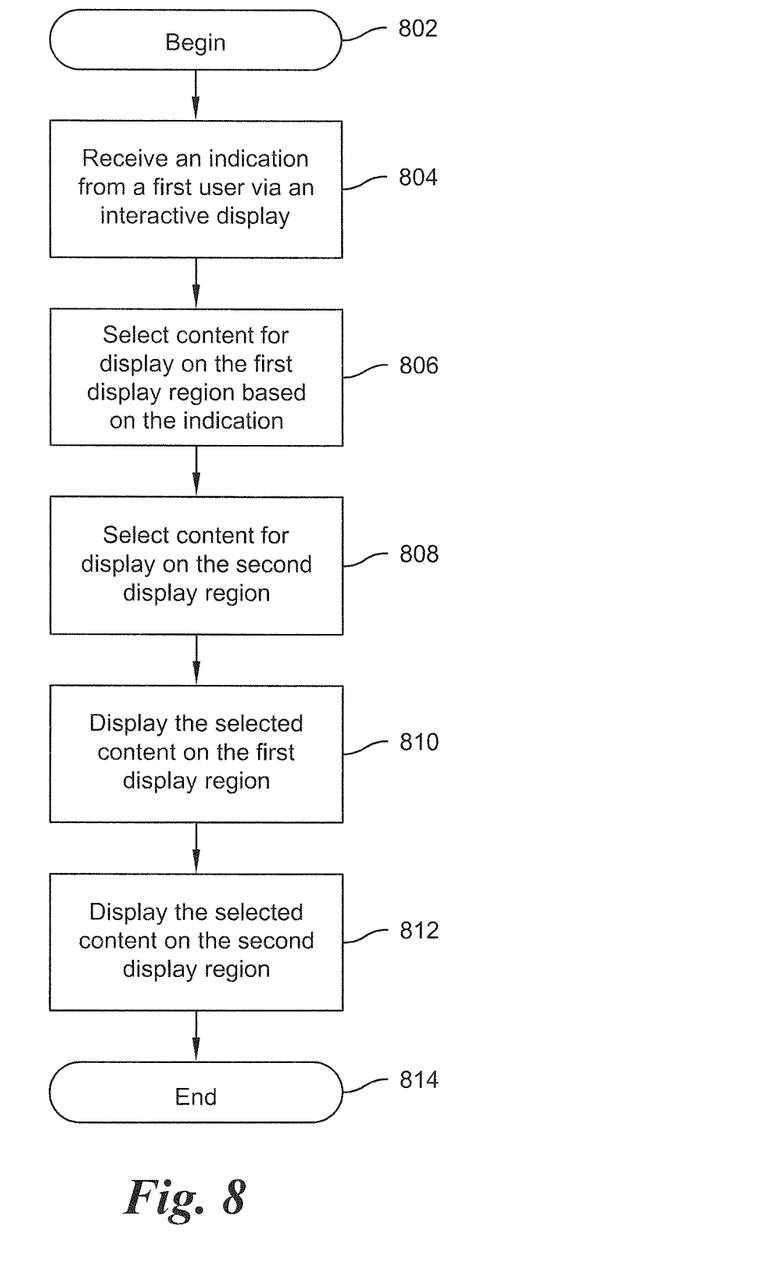
FIG. 8 is a flow chart for a system with multi-region interactive display in accordance with some embodiments.

FIG. 8 is a flow chart for a system with multi-region interactive display in accordance with some embodiments. At stage 802, the process begins. At stage 804, an indication from a first user via an interactive display is received. At stage 806, content for display on the first display region based on the indication is selected. At stage 808, content for display on the second display region is selected. At stage 810, the selected content is displayed on the first display region. At stage 812, the selected content is displayed on the second display region. At stage 814, the process is completed.

Figure 9:
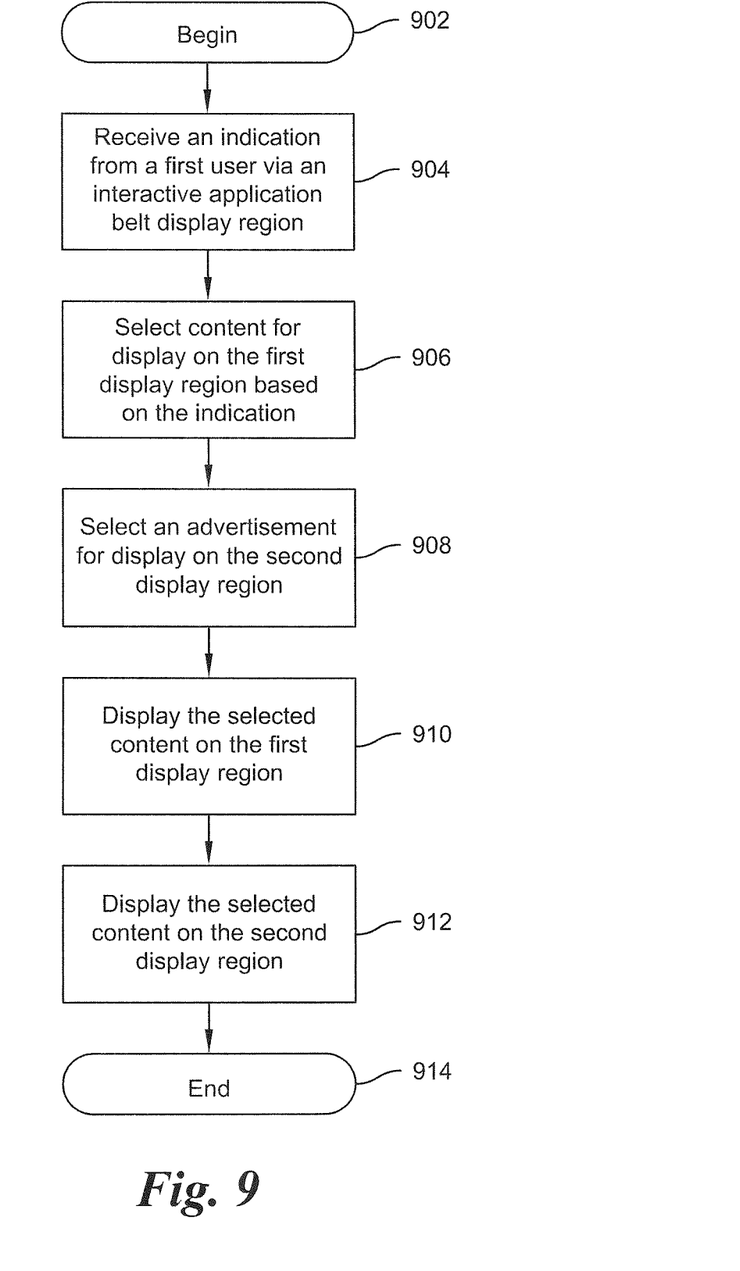
FIG. 9 is another flow chart for a system with multi-region interactive display in accordance with some embodiments.

FIG. 9 is another flow chart for a system with multi-region interactive display in accordance with some embodiments. At stage 902, the process begins. At stage 904, an indication from a first user via an interactive application belt display region is received. At stage 906, content for display on the first display region based on the indication is selected. At stage 908, an advertisement for display on the second display region is selected (e.g., at least in part based on the selected content for display on the first display region and/or at least in part based on the location/venue of the system). At stage 910, the selected content is displayed on the first display region. At stage 912, the selected content is displayed on the second display region. At stage 914, the process is completed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling content displayed by digital multimedia jukeboxes, each jukebox having a plurality of display regions, the method comprising:
    locating a plurality of the digital multimedia jukeboxes at a plurality of distinct locations, at least one of the plurality of display regions including a plurality of distinct, unrelated, selectable applications;
    defining first and second content policies, the first content policy being associated with a first location of a first venue type, and the second content policy being associated with a second location of a second venue type, the first venue type being different than the second venue type; and
    assigning each digital multimedia jukebox to the first or second content policy based on whether the digital multimedia jukebox is at the first location or the second location, each digital multimedia jukebox being configured to select content to be displayed on at least one of the plurality of display regions based on the content policy assigned thereto, wherein the content to be displayed is generated by at least one first user of the plurality of digital media jukeboxes, via at least one of the plurality of distinct, unrelated, selectable applications, the generated content to be displayed being capable of being viewed by at least one second user.

2. The method of claim 1, wherein the first and second content policies are automatically assigned to the plurality of digital multimedia jukeboxes.

3. The method of claim 2, further comprising transmitting the assigned content policies to the respective digital multimedia jukeboxes.

4. The method of claim 3, wherein the first and second locations are geographic locations.

5. The method of claim 1, wherein the plurality of display regions include a first display region, a second display region, and an application belt region.

6. The method of claim 5, wherein the application belt region displays a plurality of applications executable by the respective digital multimedia jukeboxes.

7. The method of claim 1, wherein the content is text content, music content, video content, or image content.

8. The method of claim 7, wherein the image content further comprises album art.

9. The method of claim 1, wherein the first and second content policies are determined by the respective system operators of the digital multimedia jukeboxes.

10. A method of selecting content for display by a digital multimedia jukebox having a plurality of display regions, the method comprising:
    assigning the digital multimedia jukebox to a first group if the digital multimedia jukebox is at a first location of a first venue type, and a second group if the digital multimedia jukebox is at a second location of a second venue type, the first venue type being different than the second venue type;
    receiving, by the digital multimedia jukebox from a host system over a network (i) a first or second content policy associated with the assigned group, the first and second content policies identifying content presentation allowances or restrictions, and (ii) a plurality of content choices, the first content policy being associated with the first location, and the second content policy being associated with the second location;
    selecting content to be displayed by the digital multimedia jukebox from the plurality of multimedia content choices based on the received first or second content policy, wherein the content to be displayed is generated via at least one of a plurality of distinct, unrelated, selectable applications on at least one of the plurality of display regions by at least one first user of the plurality of digital media jukeboxes, the generated content to be displayed being capable of being viewed by at least one second user; and
    displaying the selected content in response to determining that the selected content complies with the first or second content policy.

11. The method of claim 10, wherein the first and second content policies are automatically assigned to the digital multimedia jukebox based on the location.

12. The method of claim 11, wherein the location is a geographic location of the digital multimedia jukebox.

13. The method of claim 10, wherein the plurality of display regions include a first display region, a second display region, and a belt region.

14. The method of claim 13, wherein the belt region displays a plurality of applications executable by the respective digital multimedia jukeboxes.

15. The method of claim 10, wherein the content is text content, music content, video content or image content.

16. The method of claim 15, wherein the image content further comprises album art.

17. The method of claim 10, wherein a system operator of the digital multimedia jukebox determines the first and second content policies.

* * * * *